(12) United States Patent
Nakura et al.

(10) Patent No.: US 6,817,775 B2
(45) Date of Patent: Nov. 16, 2004

(54) OPTICAL CONNECTOR WITH ELECTROMAGNETIC NOISE SHIELDING AND HEAT RADIATING PROPERTIES

(75) Inventors: Yuji Nakura, Nagoya (JP); Hitoshi Imazu, Nagoya (JP); Kazuhiro Asada, Nagoya (JP)

(73) Assignees: Sumitomo Wiring Systems, Ltd., Mie (JP); Autonetworks Technologies, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 8 days.

(21) Appl. No.: 10/114,242

(22) Filed: Apr. 3, 2002

(65) Prior Publication Data

US 2002/0146208 A1 Oct. 10, 2002

(30) Foreign Application Priority Data

Apr. 6, 2001 (JP) .................................... 2001-108321
Apr. 6, 2001 (JP) .................................... 2001-108322

(51) Int. Cl.[7] .............................................. G02B 6/36
(52) U.S. Cl. ........................................ 385/53; 385/92
(58) Field of Search .............................. 385/53, 92, 55, 385/76, 88

(56) References Cited

U.S. PATENT DOCUMENTS

| 5,233,676 A | | 8/1993 | Yonemura et al. | |
|---|---|---|---|---|
| 5,280,191 A | | 1/1994 | Chang | |
| 6,113,280 A | * | 9/2000 | Nagaoka et al. | 385/53 |
| 6,499,889 B1 | * | 12/2002 | Shirakawa et al. | 385/88 |
| 6,508,595 B1 | * | 1/2003 | Chan et al. | 385/92 |
| 6,540,414 B1 | * | 4/2003 | Brezina et al. | 385/92 |
| 6,655,855 B2 | * | 12/2003 | Nakura et al. | 385/92 |
| 2002/0136506 A1 | * | 9/2002 | Asada et al. | 385/92 |

FOREIGN PATENT DOCUMENTS

| EP | 0 053 482 | 6/1982 |
|---|---|---|
| JP | A 5-3330 | 1/1993 |
| JP | 05 003330 | 1/1993 |

* cited by examiner

Primary Examiner—Michael C. Zarroli
(74) Attorney, Agent, or Firm—Oliff & Berridge, PLC

(57) ABSTRACT

An optical connector according to this invention includes a connector housing having a casing receiving recess formed therein, a metal shield casing for receiving an element body portion of an optical element therein, and a metal shield cover for covering the connector housing. The metal shield casing is received and held in the casing receiving recess. The metal shield casing and the metal shield cover are thermally connected to each other being in mutual contact; the side surface of the metal shield casing is exposed to the exterior of the connector housing to be in surface-to-surface contact with the metal shield cover and therefore heat, generated by the optical element, is transferred to the metal shield cover from the metal shield casing and is easily radiated from the metal shield cover to the exterior. The metal shield casing and the metal shield cover may be formed integrally to constitute a shield member.

10 Claims, 5 Drawing Sheets

OPTICAL CONNECTOR WITH ELECTROMAGNETIC NOISE SHIELDING AND HEAT RADIATING PROPERTIES

BACKGROUND OF THE INVENTION

1. Field of the Invention

This invention relates to an optical connector used in the field of optical communication for an OA equipment, an FA equipment, an on-vehicle equipment and so on.

2. Background Art

In an optical connector of the type in which an optical element for effecting the photoelectric conversion is received in a connector housing, it is necessary to provide countermeasures for reducing the influence of electromagnetic noises, applied from the exterior to the interior optical element, and the influence of electromagnetic noises applied from the interior optical element to the exterior. Particularly in those optical connectors used in an automobile or the like which provides an electromagnetically poor environment, there has been a great demand for such electromagnetic-noise countermeasures.

In one conventional optical connector provided with electromagnetic-noise countermeasures, the outer periphery of a connector housing is covered with a metal shield cover.

However, for example, when the above conventional optical connector was subjected to very intense electromagnetic noises, the shielding effect, obtained only with the metal shield cover, was inadequate, and there was a fear that a malfunction of an optical element or the like was encountered.

And besides, the optical element was surrounded by a connector housing made of a resin, and therefore heat, generated by the optical element, could not be efficiently radiated to the exterior, and there was a fear that a shortened lifetime, breakage and so on of the optical element were encountered. Particularly when the optical connector is used in an environment in which the temperature of the atmosphere is high, such problems become conspicuous.

SUMMARY OF THE INVENTION

It is therefore an object of this invention to provide an optical connector which is excellent both in electromagnetic noise-shielding properties and in heat-radiating properties.

The above problems have been solved by an optical connector of the invention comprising a metal shield casing for receiving an element body portion of an optical element; a connector housing having a casing receiving recess formed therein, the metal shield casing being received and held in the casing receiving recess in such a manner that at least part of the metal shield casing is exposed; and a metal shield cover which covers the outside of the connector housing in such a manner that the metal shield cover is held in contact with that portion of the metal shield casing exposed to the exterior of the connector housing.

There may be adopted a construction in which the whole of a rear surface of the metal shield casing is exposed to the exterior through a rear side of the connector housing, and the metal shield cover covers the connector housing in such a manner that the metal shield cover is held in surface-to-surface contact with the whole of the rear surface of the metal shield casing.

There may be adopted a construction in which the optical connector is adapted to be mounted on and fixed to a mounting board, and the metal shield cover covers the connector housing except that portion thereof for connection to a mating optical connector and that portion thereof for contact with the mounting board when the optical connector is fixedly mounted on the mounting board.

There may be adopted a construction in which the optical connector is adapted to be mounted on and fixed to a mounting board, and a soldering portion, adapted to be connected to a grounding wiring pattern formed on the mounting board, or a screw-fastening fixing portion, adapted to be fastened by a screw to the mounting board in contacted relation to the grounding wiring pattern formed on the mounting board, is formed on at least one of the metal shield cover and the metal shield casing.

Another aspect of this invention is an optical connector, which comprises: a connector housing, having a casing receiving recess formed therein; and a shield member including a metal shield casing portion for receiving an element body portion of an optical element therein, and a metal shield cover portion covering the connector housing, the metal shield casing portion being received and held in the casing receiving recess, and the metal shield casing portion being formed integrally with the metal shield cover portion.

According to another aspect of this invention, there may be adopted a construction in which the casing receiving recess is open to a rear side of the connector housing; and the metal shield cover portion includes an upper wall, covering an upper surface of the connector housing, a pair of opposite side walls, respectively covering opposite side surfaces of the connector housing, and a rear wall covering the rear opening in the connector housing; and the metal shield casing portion is formed in a projected manner on an inner surface of the rear wall in such a manner that the metal shield casing portion is spaced from the upper wall and the opposite side walls to form a gap therebetween into which a peripheral wall portion of the casing receiving recess can be fitted; and the metal shield casing portion is inserted into the casing receiving recess through the rear opening in the connector housing, and is held in the recess.

According to another aspect of this invention, there may be adopted a construction in which a soldering portion, adapted to be connected to a grounding wiring pattern formed on a mounting board, or a screw-fastening fixing portion, adapted to be fastened by a screw to the mounting board in contacted relation to the grounding wiring pattern formed on the mounting board, is formed on at least one of the metal shield cover portion and the metal shield casing portion.

DETAILED DESCRIPTION OF THE PREFERRED EMBODIMENTS

The First Preferred Embodiment

A preferred embodiment of an optical connector of the present invention will now be described.

Figure 1:
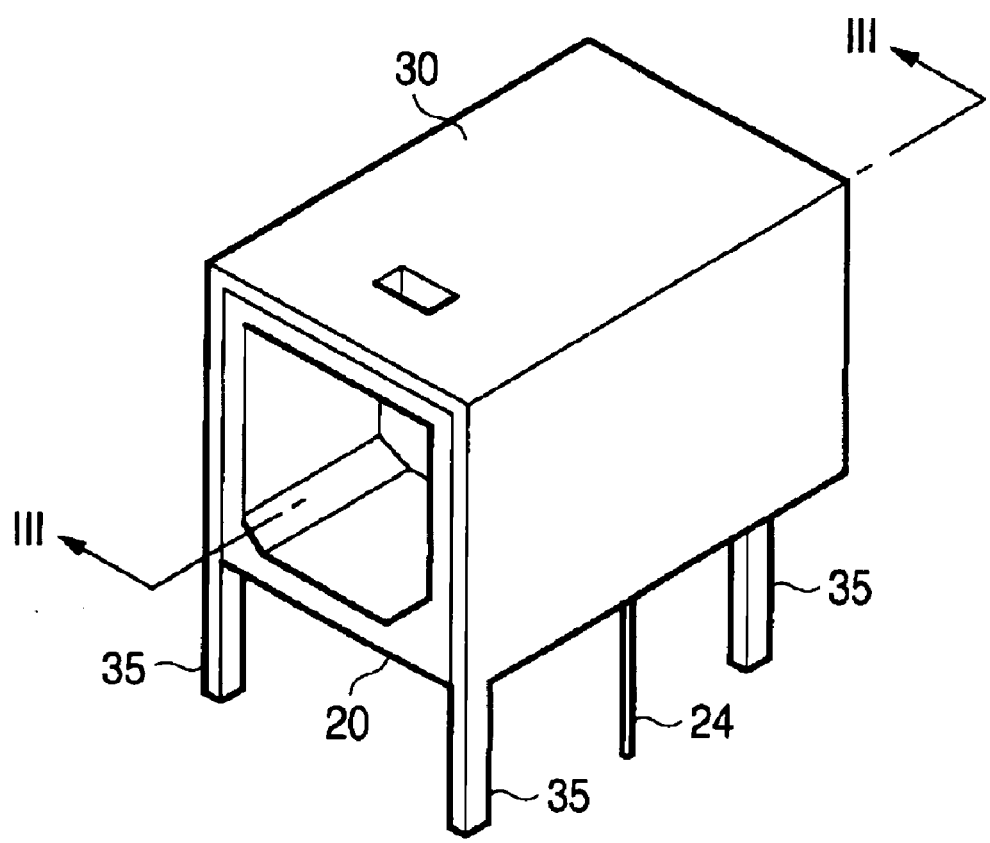
FIG. 1 is a perspective view showing a preferred embodiment of an optical connector of the present invention.
Figure 2:
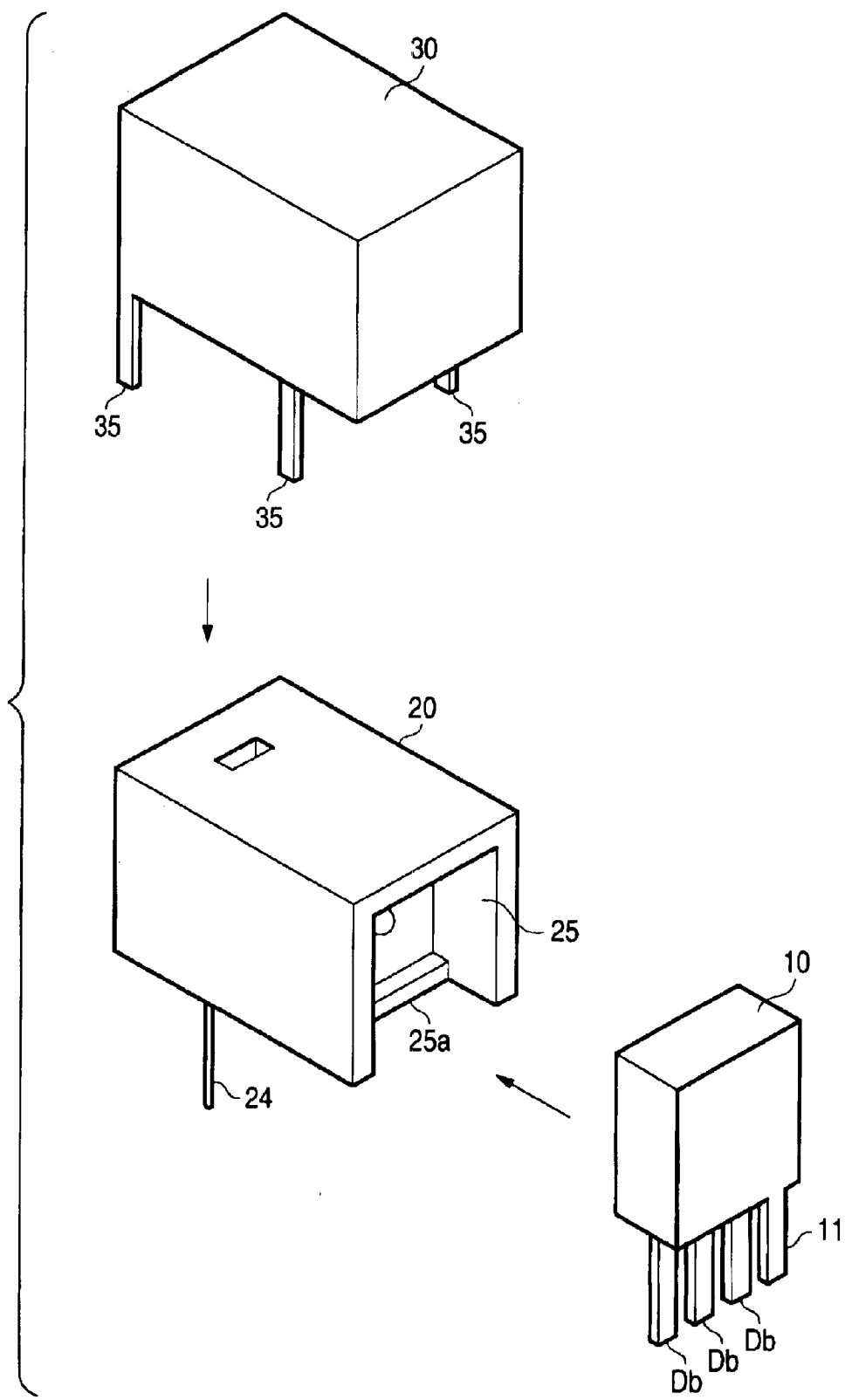
FIG. 2 is an exploded, perspective view of the optical connector.
Figure 3:
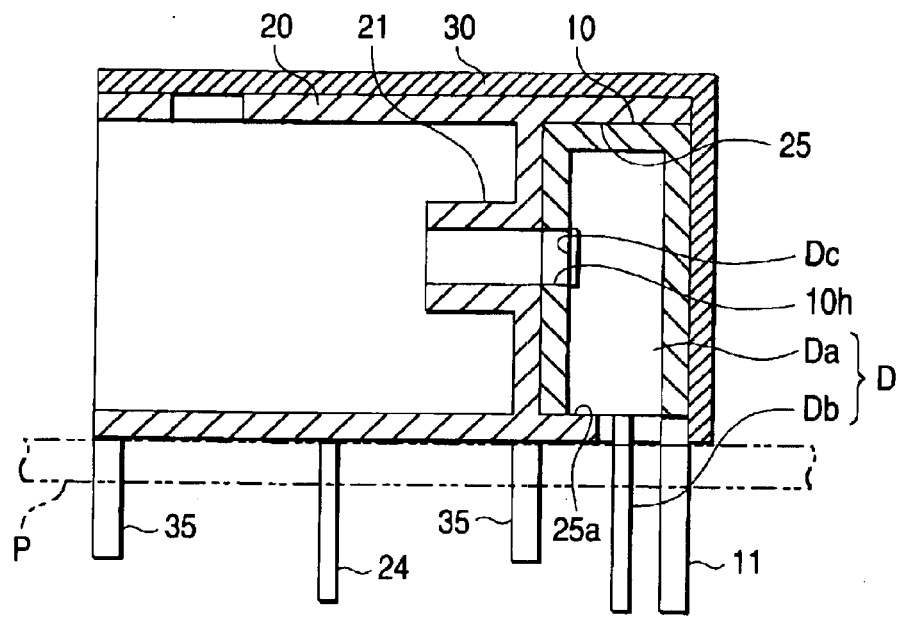
FIG. 3 is a cross-sectional view taken along the line III—III of FIG. 1.

As shown in FIGS. 1 to 3, this optical connector comprises a metal shield casing 10, a connector housing 20, and a metal shield cover 30.

Although the optical connector of this embodiment is of the single-pole type containing a single optical element D, the invention can be applied also to other types containing a plurality of optical elements D.

The constituent elements will be described. The metal shield casing 10 is so formed as to receive an element body portion Da of the optical element D. More specifically, the metal shield casing 10 is formed by blanking and bending a sheet made of a metal material such as brass, phosphor bronze, stainless steel and German silver (nickel silver). This metal shield casing has a generally box-shape with an open bottom, and the element body portion Da of the optical element D is inserted into the metal shield casing through this bottom opening, so that the whole of the element body portion Da is received within the metal shield casing 10.

A pin-like solder-fixing portion 11 extends downwardly from the metal shield casing 10. When the element body portion Da of the optical element D is received in the metal shield casing 10, lead portions Db, extending downwardly from this element body portion Da, extend downwardly through the bottom opening in the metal shield casing 10. This optical connector is mounted on a mounting board P, and in this condition the lead portions Db and the solder-fixing portion 11 are passed respectively through corresponding through holes, formed through the mounting board P, and are suitably soldered to a signal wiring pattern or a grounding wiring pattern formed on a reverse surface of this mounting board.

A window portion 10h is formed in the front side of the metal shield casing 10, and an optical coupling portion (light-emitting surface or a light-receiving surface) Dc of the element body portion Da, received in the metal shield casing 10, is exposed to the exterior through this window portion 10h.

The connector housing 20 has a casing receiving recess 25 formed therein, and the metal shield casing 10 can be received and held in this receiving recess, with at least part of the metal shield casing exposed.

In this embodiment, the connector housing 20 is made of an insulative resin or the like, and has a generally square tubular shape, and the casing receiving recess 25 is formed in a rear portion of this connector housing, and has an open rear side and an open bottom side. When the metal shield casing 10 is received in the casing receiving recess 25, the rear surface of the metal shield casing 10 is exposed to the exterior of the connector housing 20 through a rear opening of the casing receiving recess 25.

Here, the bottom surface of the metal shield casing 10 does not always need to be exposed to the exterior of the connector housing 20, and for example, a side surface or an upper surface of the metal shield casing 10 may be exposed to the exterior of the connector housing 20. However, in the case where the rear surface of the metal shield casing 10 is exposed to the exterior, and the upper and opposite side surfaces thereof are held against upper and opposed side surfaces of the casing receiving recess 25, respectively, the metal shield casing 10 is positioned in an upward direction and a widthwise direction, and therefore there is achieved an advantage that the precision of positioning of the optical coupling portion Dc of the optical element D (within the metal shield casing 10) relative to a ferrule guide portion 21 (described later) is enhanced. A positioning projection 25a is formed on an inner end surface of the casing receiving recess 25 at a lower end thereof, and the lower end of the metal shield casing 10 at the front side thereof is engaged with this positioning projection 25a, so that the positioning of the metal shield casing 10 in the downward direction is effected.

The front portion of the connector housing 20 is formed into a generally square tubular shape so as to fit on a mating connector (not shown), and the ferrule guide portion 21 is formed within this front portion. The ferrule guide portion 21 is formed in such a position as to be disposed in registry with the window portion 10h in the metal shield casing 10 received in the casing receiving recess 25 (see FIG. 3). When the mating connector is connected to this optical connector, a ferrule of the mating connector is inserted into the ferrule guide portion 21, and is guided toward the window portion 10h. As a result, an end surface of an optical fiber, held in the ferrule, is disposed in opposed relation to the optical coupling portion Dc of the optical element D, so that the optical fiber is optically coupled to the optical element D.

A positioning fixing portion 24 is formed on and extends downwardly from the bottom surface of the connector housing 20. When this optical connector is to be mounted on and fixed to the mounting board P, the positioning fixing portion 24 is passed through a positioning fixing hole formed through the mounting board P, and a lower end portion of the positioning fixing portion 24, projecting downwardly from the mounting board P, is thermally crushed, thereby positioning and fixing this optical connector relative to the mounting board P.

The metal shield cover 30 is so constructed as to cover the outer side of the connector housing 20 in such a manner that this cover is held in contact with that portion of the metal shield casing 10 exposed to the exterior of the connector housing 20.

In this embodiment, the metal shield cover 30 is so formed as to cover the connector housing 20 (that is, the upper surface, opposite side surfaces and rear surface of this connector housing) except that portion thereof (that is, the front portion) for connection to the mating optical connector and that portion thereof (that is, the bottom) for contact with the mounting board P when this optical connector is fixedly mounted on the mounting board P.

More specifically, the metal shield cover 30 is formed by blanking and bending a sheet made of a metal material such as brass, phosphor bronze, stainless steel and German silver (nickel silver), and this metal shield cover has a generally box-shape with an open front side and an open bottom.

When the metal shield cover 30 is attached to the connector housing 20 to cover the same, an inner surface of an upper wall of the metal shield cover 30 is held in surface-to-surface contact with the upper surface of the connector housing 20, and also inner surfaces of opposite side walls of the metal shield cover 30 are held in surface-to-surface contact with the opposite outer side surfaces of the connector housing 20, respectively. In this embodiment, the rear surface of the metal shield casing 10 is exposed to the rear side of the connector housing 20, and therefore an inner surface of a rear wall of the metal shield cover 30 is held in surface-to-surface contact with the rear surface of the metal shield casing 10.

Pin-like solder-fixing portions 35 extend downwardly from a lower edge of the metal shield cover 30. In this embodiment, there are provided four solder-fixing portions 35 in all, that is to say, two extend downwardly respectively from the lower edges of the opposite side walls of the metal shield cover 30 at the front end thereof, while the other two extend downwardly respectively from the lower edges of rear portions of the opposite side walls of the metal shield cover 30. When this optical connector is to be mounted on and fixed to the mounting board P, the solder-fixing portions 35 are passed respectively through corresponding through holes, formed through the mounting board P, and are soldered to the grounding wiring pattern formed on the reverse surface of the mounting board P, and by doing so, the metal shield cover 30 is positioned and fixed relative to the mounting board P in such a manner that this cover 30 is grounded to the grounding wiring pattern.

The optical connector of this construction is assembled and fixedly mounted on the mounting board P in the following manner.

First, the element body portion Da of the optical element D is inserted into the metal shield casing 10, and this metal shield casing 10 is inserted into the casing receiving recess 25 through the rear opening in the connector housing 20. Then, the metal shield cover 30 is fitted on the connector housing 20 to cover the same in such a manner that the inner surface of the rear wall of the metal shield cover 30 is held in surface-to-surface contact with the rear surface of the metal shield casing 10. Then, the lead portions Db of the optical element D, the solder-fixing portion 11 of the metal shield casing 10 and the solder-fixing portions 35 of the metal shield cover 30 are passed respectively through the corresponding through holes formed through the mounting board P, and also the positioning fixing portion 24 of the connector housing 20 is passed through the positioning fixing hole formed through the mounting board P. Finally, the lead portions Db are soldered to the signal wiring pattern on the reverse surface of the mounting board P, and the sold-fixing portions 11 and 35 are soldered to the grounding wiring pattern on the reverse surface of the mounting board P, and further the lower end portion of the positioning fixing portion 24 is thermally crushed, thus completing the mounting and fixing of this optical connector.

In the optical connector of the above construction, the optical element D is covered in a double manner with both of the metal shield casing 10 and the metal shield cover 30, and therefore this optical connector is excellent in electromagnetic noise-shielding properties. And besides, the metal shield cover 30 is disposed in contact with that portion of the metal shield casing 10 exposed to the exterior of the connector housing 20, and therefore heat, generated by the optical element D is transferred to the metal shield cover 30 from the metal shield casing 10, and is easily radiated from the metal shield cover 30 to the exterior, and therefore the heat-radiating effect for the optical element D is excellent.

Particularly, the metal shield cover 30 covers the outside of the connector housing 20, and the area of exposure of this cover 30 to the exterior is large, and therefore the heat-radiating properties are more excellent.

The whole of the rear surface of the metal shield casing 10 is exposed to the exterior through the rear side of the connector housing 20, and the metal shield cover 30 covers the connector housing 20 in such a manner that this covers is held in surface-to-surface contact with the whole of the rear surface of the metal shield casing 10, and therefore heat is efficiently transferred from the metal shield casing 10 to the metal shield cover 30, so that the heat-radiating effect for the optical element D is excellent.

In this embodiment, although the solder-fixing portions 11 and 35 are formed on the metal shield casing 10 and the metal shield cover 30, the solder-fixing portions may be formed on only one of the two.

Mounting piece portions for extending over the upper surface of the mounting board P may be formed on one or both of the metal shield casing 10 and the metal shield cover 30, and these mounting piece portions are fixedly secured to the mounting board P by screws. In this case, there may be used an arrangement in which grounding wiring patterns are formed on those areas of the mounting board P to which the mounting piece portions are fixed, respectively, and the mounting piece portions are superposed on the respective grounding wiring patterns, and are fixed to the mounting board by the screws, and by doing so, the metal shield casing 10 and the metal shield cover 30 can be grounded.

In the optical connector of the above construction, the optical element is covered with both of the metal shield casing and the metal shield cover, and therefore this optical connector is excellent in electromagnetic noise-shielding properties. And besides, the metal shield cover is disposed in contact with that portion of the metal shield casing exposed to the exterior of the connector housing, and therefore heat, generated by the optical element is transferred to the metal shield cover from the metal shield casing, and is easily radiated from the metal shield cover to the exterior, and therefore the heat-radiating effect for the optical element is excellent. Particularly, the metal shield cover covers the outside of the connector housing, and the area of exposure of this cover to the exterior is large, and therefore the heat-radiating properties are more excellent.

Further, according to this construction, the whole of the rear surface of the metal shield casing is exposed to the exterior through the rear side of the connector housing, and the metal shield cover covers the connector housing in such a manner that this covers is held in surface-to-surface contact with the whole of the rear surface of the metal shield casing. With this construction, heat is efficiently transferred from the metal shield casing to the metal shield cover, so that the heat-radiating effect for the optical element is excellent.

The Second Preferred Embodiment

Another preferred embodiment of an optical connector of the present invention will now be described.

Figure 4:
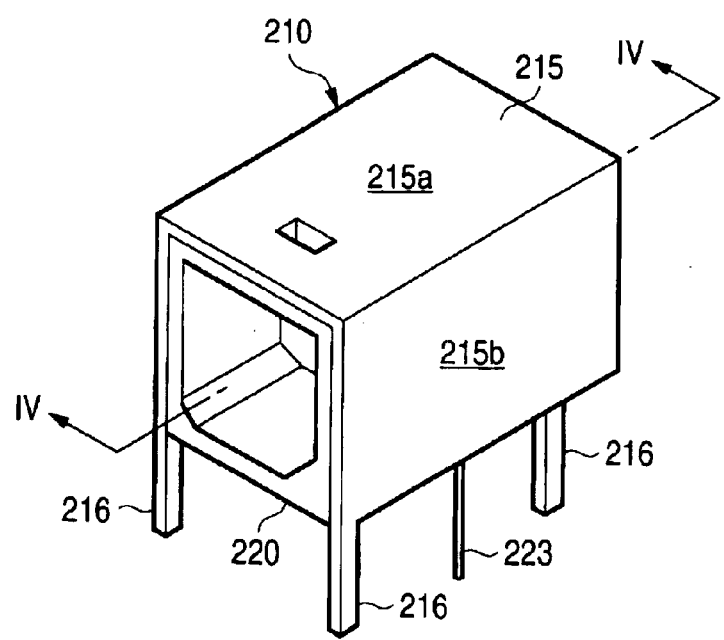
FIG. 4 is a perspective view showing a preferred embodiment of an optical connector of the present invention.
Figure 5:
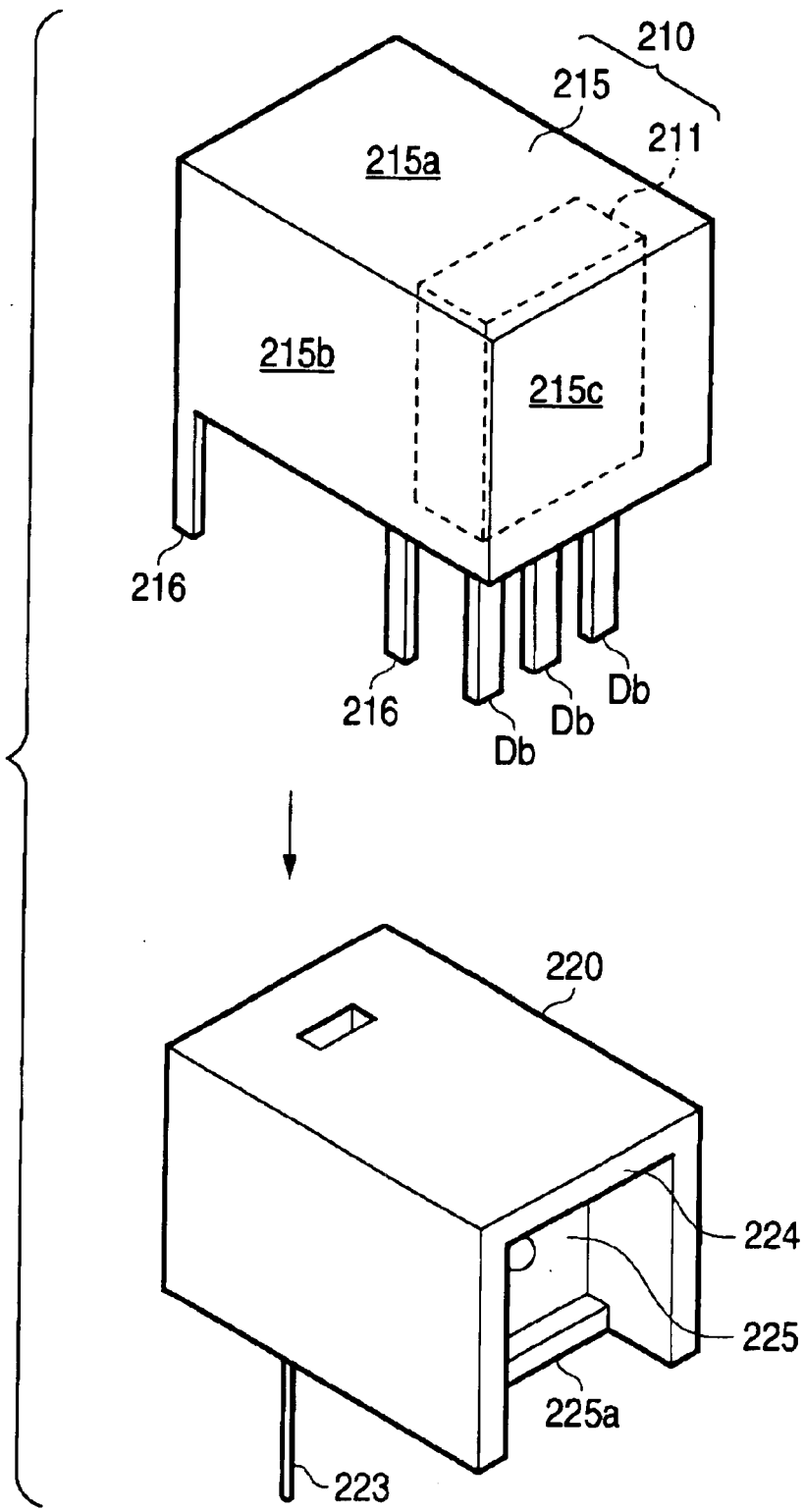
FIG. 5 is an exploded, perspective view of the optical connector.
Figure 6:
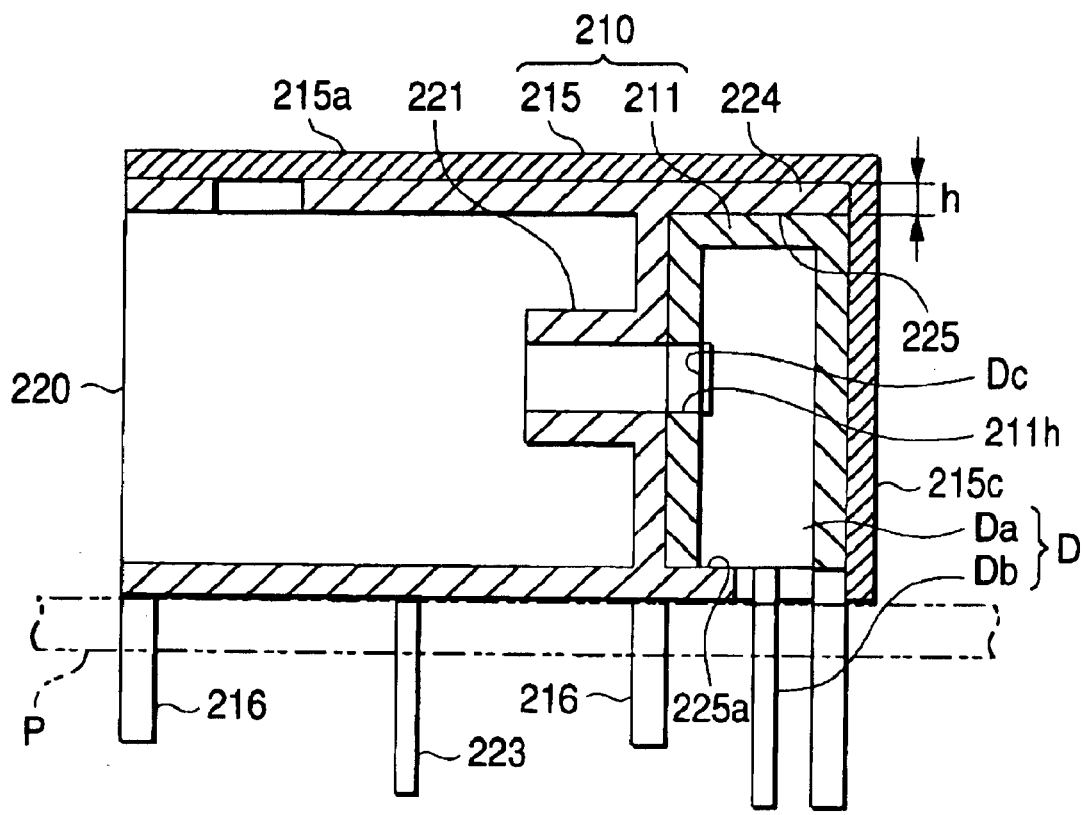
FIG. 6 is a cross-sectional view taken along the line IV—IV of FIG. 4.

As shown in FIGS. 4 to 6, this optical connector comprises a connector housing 220, and a shield member 210.

Although the optical connector of this embodiment is of the single-pole type containing a single optical element D, the invention can be applied also to other types containing a plurality of optical elements D.

The constituent elements will be described. The connector housing 220 has a casing receiving recess 225 formed therein.

In this embodiment, the connector housing 220 is made of an insulative resin or the like, and has a generally square tubular shape, and the casing receiving recess 225 is formed in a rear portion of this connector housing. The casing receiving recess 225 has an open rear side and an open bottom side, and a metal shield casing portion 211 (described later) is inserted into the casing receiving recess 225 through this rear opening, and is held in this recess 225. The metal shield casing portion 211 and a metal shield cover portion 215 (described later) are integrally connected together at the rear portion of the connector housing 220 in which the rear opening is formed.

A positioning projection 225a is formed on an inner end surface of the casing receiving recess 225 at a lower end thereof, and a lower end of the metal shield casing portion 211 at the front side thereof is engaged with this positioning projection 225a, so that the positioning of the metal shield casing portion 211 in the downward direction is effected.

The front portion of the connector housing 220 is formed into a generally square tubular shape so as to fit on a mating connector (not shown), and a ferrule guide portion 221 is formed within this front portion. The ferrule guide portion 221 is formed in such a position corresponding to a window portion 211h (described later), formed in the front side of the metal shield casing portion 211 received in the casing receiving recess 225 (see FIG. 6). When the mating connector is connected to this optical connector, a ferrule of the mating connector is inserted into the ferrule guide portion 221, and is guided toward the window portion 211h. As a result, an end surface of an optical fiber, held in the ferrule, is disposed in opposed relation to an optical coupling portion Dc of the optical element D, so that the optical fiber is optically coupled to the optical element D.

A positioning fixing portion 223 is formed on and extends downwardly from the bottom surface of the connector housing 220. When this optical connector is to be mounted on and fixed to a mounting board P, the positioning fixing portion 223 is passed through a positioning fixing hole formed through the mounting board P, and a lower end portion of the positioning fixing portion 223, projecting downwardly from the mounting board P, is thermally crushed, thereby positioning and fixing this optical connector relative to the mounting board P.

The shield member 210 comprises the metal shield casing portion 211 (for receiving an element body portion Da of the optical element D therein) and the metal shield cover portion 215 (for covering the connector housing 220) which are integrally formed with each other.

The metal shield casing portion 211 has a generally box-shape with an open bottom, and the element body portion Da of the optical element D is inserted into the metal shield casing portion through this bottom opening, so that the whole of the element body portion Da is received within the metal shield casing portion 211.

When the element body portion Da of the optical element D is received in the metal shield casing portion 211, lead portions Db, extending downwardly from this element body portion Da, extend downwardly through the bottom opening in the metal shield casing portion 211. This optical connector is mounted on the mounting board P, and in this condition the lead portions Db are passed respectively through corresponding through holes, formed through the mounting board P, and are suitably soldered to a signal wiring pattern formed on a reverse surface of this mounting board.

The window portion 210h is formed in the front side of the metal shield casing portion 211, and the optical coupling portion (light-emitting surface or a light-receiving surface) Dc of the element body portion Da, received in the metal shield casing portion 211, is exposed to the exterior through this window portion 211h.

The metal shield cover portion 215 is formed into such a shape as to cover the outside of the connector housing 220.

In this embodiment, the metal shield cover portion 215 includes an upper wall 215a for covering an upper surface of the connector housing 220, a pair of opposite side walls 215b for respectively covering opposite side surfaces of the connector housing 220, and a rear wall 215c for covering the rear opening in the connector housing 220. Namely, this metal shield cover portion has a generally box-shape with an open front side and an open bottom.

Pin-like solder-fixing portions 216 extend downwardly from a lower edge of the metal shield cover portion 215. In this embodiment, there are provided four solder-fixing portions 216 in all, that is to say, two extend downwardly respectively from the lower edges of the opposite side walls of the metal shield cover portion 215 at the front end thereof, while the other two extend downwardly respectively from the lower edges of rear portions of the opposite side walls of the metal shield cover 215. When this optical connector is to be mounted on and fixed to the mounting board P, the solder-fixing portions 216 are passed respectively through corresponding through holes, formed through the mounting board P, and are soldered to a grounding wiring pattern formed on the reverse surface of the mounting board P, and by doing so, the metal shield cover portion 215 is positioned and fixed relative to the mounting board P in such a manner that this cover portion 215 is grounded to the grounding wiring pattern.

The metal shield casing portion 211 is integrally formed within the metal shield cover portion 215.

In this embodiment, the metal shield casing portion 211 is formed on and projects from the inner surface of the rear wall 215c. The upper surface and opposite side surfaces of the metal shield casing portion 211 are spaced respectively from the upper wall 215a and opposite side walls 215b to form a gap, having a gap dimension h, therebetween, and a peripheral wall portion 224 of the casing receiving recess 225 can be fitted in this gap. The metal shield cover portion 215 can be fitted on the connector housing 220 from the rear side thereof to cover the same, so that the metal shield casing portion 211 can be inserted into the casing receiving recess 225 through the rear opening in the connector housing 220.

When the metal shield casing portion 211 is received in the casing receiving recess 225, the upper surface and opposite side surfaces of the metal shield casing portion 211 are held in contact with the inner surface of the peripheral wall portion 224, so that the positioning of the metal shield casing portion 211 in the widthwise direction and upward direction is effected. Therefore, the misregistration of the ferrule guide portion 221 relative to the window portion 211h of the metal shield casing portion 211 is less liable to occur.

The metal shield casing portion 211 and the metal shield cover portion 215 are made of a metal material such as brass, phosphor bronze, stainless steel and German silver (nickel silver), and these portions are formed by blanking and bending a metal sheet, or by cutting a metal block, or by processing a metal blank by dies, so that the two are formed into an integral construction. Alternatively, the metal shield casing portion 211 and the metal shield cover portion 215 are formed separately from each other, for example, by blanking and bending a metal sheet, and then the two are integrally connected together by an adhesive having good electrical and thermal conductivities.

The optical connector of this construction is assembled and fixedly mounted on the mounting board P in the following manner.

First, the element body portion Da of the optical element D is inserted into the metal shield casing portion 211. Then, the metal shield cover portion 215 is fitted on the connector housing 220 from the rear side thereof to cover the same, and at the same time the metal shield casing portion 211 is inserted into the casing receiving recess 225 through the rear opening in the connector housing 220, thereby attaching the shield member 210 to the connector housing 220. Then, the lead portions Db of the optical element D and the solder-fixing portions 216 of the metal shield cover portion 215 are passed respectively through the corresponding through holes formed through the mounting board P, and also the positioning fixing portion 223 of the connector housing 220 is passed through the positioning fixing hole formed through the mounting board P. Finally, the lead portions Db are soldered to the signal wiring pattern on the reverse surface of the mounting board P, and the sold-fixing portions 216 are soldered to the grounding wiring pattern on the reverse surface of the mounting board P, and further the lower end portion of the positioning fixing portion 223 is thermally crushed, thus completing the mounting and fixing of this optical connector.

In the optical connector of the above construction, the optical element D is covered in a double manner with both of the metal shield casing portion 211 and the metal shield cover portion 215, and therefore this optical connector is excellent in electromagnetic noise-shielding properties. And besides, the metal shield casing portion 211 and the metal shield cover portion 215 are formed integrally with each other, and therefore heat, generated by the optical element D, is transferred to the metal shield cover portion 215 from the metal shield casing portion 211, and is easily radiated from this metal shield cover portion 215 to the exterior, and therefore the heat-radiating effect for the optical element D is excellent. Particularly, the metal shield cover portion 215 covers the outside of the connector housing 220, and the area of exposure of this cover portion to the exterior is large, and therefore the heat-radiating properties are more excellent.

The casing receiving recess 225 is open to the rear side of the connector housing 220, and the metal shield cover portion 215 includes the upper wall 215a, covering the upper surface of the connector housing 220, the pair of opposite side walls 215b, respectively covering the opposite side surfaces of the connector housing 220, and the rear wall 215c covering the rear side of the connector housing 220. The metal shield casing portion 211 is formed on and projects from the inner surface of the rear wall 215c in such a manner that this metal shield casing portion 211 is spaced from the upper wall 215a and the opposite side walls 215b to form the gap therebetween into which the peripheral wall portion 224 of the casing receiving recess 225 can be fitted. The metal shield casing portion 211 is inserted into the casing receiving recess 225 through the rear opening in the connector housing 220, and is held in this recess. Therefore, the metal shield casing portion 211 is held in the casing receiving recess 225 in such a manner that this metal shield casing portion 211 is accurately positioned in the widthwise direction and the upward direction. Therefore, the window portion 211h and the ferrule guide portion 221 are accurately positioned relative to each other, and a loss of coupling between the optical fiber and the optical element D, developing when this optical connector is connected to the mating optical connector, can be reduced.

The metal shield casing portion 211 does not always need to be formed in a projected manner on the rear wall 215c of the metal shield cover portion 215. For example, there may be adopted a construction in which the metal shield casing portion 211 is formed in a projected manner on the inner surface of the upper wall 215a of the metal shield cover portion 215, and the casing receiving recess 225 is open at its upper side, and the metal shield cover portion 215 is fitted on the connector housing 220 from the upper side to cover the same, so that the metal shield casing portion 211 is inserted into the casing receiving recess 225 through this upper opening.

In this embodiment, although the solder-fixing portions 216 are formed only on the metal shield cover portion 215, such solder-fixing portions may be formed only on the metal shield casing portion 211 or on both of the metal shield cover portion 215 and the metal shield casing portion 211.

Mounting piece portions for extending over the upper surface of the mounting board P may be formed on one or both of the metal shield casing portion 211 and the metal shield cover portion 215, and these mounting piece portions are fixedly secured to the mounting board P by screws. In this case, there may be used an arrangement in which grounding wiring patterns are formed on those areas of the mounting board P to which the mounting piece portions are fixed, respectively, and the mounting piece portions are superposed on the respective grounding wiring patterns, and are fixed to the mounting board by the screws, and by doing so, the shield member 210 can be grounded.

In the optical connector of the above construction, the optical element is covered with both of the metal shield casing portion and the metal shield cover portion, and therefore this optical connector is excellent in electromagnetic noise-shielding properties. And besides, the metal shield cover portion and the metal shield casing portion are formed integrally with each other, and therefore heat, generated by the optical element, is transferred to the metal shield cover portion from the metal shield casing portion, and is easily radiated from the metal shield cover portion to the exterior, and therefore the heat-radiating effect for the optical element is excellent. Particularly, the metal shield cover portion covers the outside of the connector housing, and the area of exposure of this cover portion to the exterior is large, and therefore the heat-radiating properties are more excellent.

According to the construction, the metal shield casing portion is inserted into the casing receiving recess through the rear opening in the connector housing, and is held in this recess, and therefore this metal shield casing portion is accurately positioned and held in the casing receiving recess.

What is claimed is:

1. An optical connector comprising:
   a connector housing having a casing receiving recess formed therein,
   a shield casing for receiving an element body portion of an optical element therein, and
   a shield cover for covering the connector housing,
   wherein the shield casing is received and held in the casing receiving recess;
   the shield casing and the shield cover are thermally connected to each other; and
   a side surface of the shield casing is exposed to the exterior of the connector housing to be in contact with the shield cover.

2. The optical connector according to claim 1, wherein the side surface of the shield casing is in contact with a side surface of the shield cover.

3. The optical connector according to claim 1, wherein the element body comprises an optical coupling portion;
   the shield casing has a window to expose the optical coupling portion to the exterior of the shield casing; and
   the window is disposed opposite to the side surface of the shield casing.

4. The optical connector according to claim 3, wherein the side surface of the shield casing is entirely brought in contact with the shield cover.

5. The optical connector according to claim 1, wherein the shield cover covers the connector housing except for a portion thereof to be connected to a mating optical connector and for a portion thereof to be in contact with a mounting board.

6. An optical connector comprising:
   a connector housing having a casing receiving recess formed therein,
   a shield casing for receiving an element body portion of an optical element therein, and
   a shield cover for covering the connector housing,
   wherein the shield casing is received and held in the casing receiving recess;
   the shield casing and the shield cover are thermally connected to each other;
   the shield cover and the shield casing are electrically connected to each other;
   and at least one of the shield cover and the shield casing comprises a connecting portion to be grounded via a grounding wiring pattern formed on a mounting board.

7. The optical connector according to claim 6, wherein the connecting portion is soldered to the grounding wiring pattern.

8. The optical connector according to claim 6, wherein the connecting portion comprises a screw for fixing at least one of the shield cover and the shield casing to the grounding wiring pattern being in mutual contact.

9. An optical connector comprising:
   a connector housing having a casing receiving recess formed therein,
   a shield casing for receiving an element body portion of an optical element therein, and
   a shield cover for covering the connector housing,
   wherein the shield casing is received and held in the casing receiving recess;
   the shield casing and the shield cover are thermally connected to each other; and
   wherein the shield casing and the shield cover are directly connected to each other by (a) being formed from a single metal sheet or a single metal block or (b) an adhesive.

10. The optical connector according to claim 9, wherein
    the casing receiving recess has a rear opening opened to a rear side of the connector housing;
    the shield cover includes an upper wall covering an upper surface of the connector housing, a pair of opposite side walls respectively covering opposite side surfaces of the connector housing, and a rear wall covering the rear opening in the connector housing;
    the shield casing has a protrusion protruding from an inner surface of the rear wall being spaced from the upper wall and the opposite side walls to form a gap between the upper surface, the opposite side walls, and the protrusion; and
    the shield casing portion is inserted into the casing receiving recess through the rear opening in the connector housing so that a peripheral wall portion of the casing receiving recess is fitted into the gap and holds the shield casing portion therein.

* * * * *